US009751022B1

(12) United States Patent
Fram (10) Patent No.: US 9,751,022 B1
(45) Date of Patent: *Sep. 5, 2017

(54) AMUSEMENT PARK RIDE WITH ADJUSTABLE THRILL LEVELS (71) Applicant: Eric Fram, Beverly Hills, CA (US)

(72) Inventor: Eric Fram, Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/342,026

(22) Filed: Nov. 2, 2016

Related U.S. Application Data (63) Continuation-in-part of application No. 14/925,085, filed on Oct. 28, 2015, now Pat. No. 9,486,135.

(51) Int. Cl.
A63G 7/00 (2006.01)
B61B 3/00 (2006.01)

(52) U.S. Cl.
CPC . A63G 7/00 (2013.01); B61B 3/00 (2013.01)

(58) Field of Classification Search
CPC .......... A63G 7/00; A63G 21/08; A63G 21/04; A63G 27/02; A63G 27/04; A63G 1/30; A63G 1/34; A63G 31/00; A63G 1/24; A63G 21/10; A63G 21/20; A63G 21/22; B60N 2/2839; B60R 2021/0097; B60R 2021/0037; B60R 2021/0206; B60R 22/26; B60R 2021/0058; B60R 2021/022; B61B 3/00
See application file for complete search history.

(56) References Cited

U.S. PATENT DOCUMENTS

| 5,238,265 | A | 8/1993 | Duce | |
|---|---|---|---|---|
| 5,529,382 | A | 6/1996 | Burkat | |
| 5,979,333 | A * | 11/1999 | Houben | A63G 21/22 104/63 |
| 7,806,054 | B2 * | 10/2010 | Baker | A63G 7/00 104/53 |
| 8,490,550 | B2 | 7/2013 | Crawford et al. | |
| 9,144,745 | B2 * | 9/2015 | Snyder | A63G 7/00 |
| 2004/0032157 | A1 * | 2/2004 | Trimborn | A63G 7/00 297/484 |
| 2006/0061202 | A1 * | 3/2006 | Meneses | B60R 22/26 297/475 |
| 2010/0164215 | A1 | 7/2010 | Nezaki | |
| 2011/0089728 | A1 * | 4/2011 | Wuerstl | B60N 2/28 297/216.11 |

(Continued)

FOREIGN PATENT DOCUMENTS

WO WO 2012/111481 8/2012
WO WO 2013/187235 12/2013

Primary Examiner — Mark Le
(74) Attorney, Agent, or Firm — Cislo & Thomas, LLP (57) ABSTRACT An amusement park ride having a car with seating options above a track, below the track or adjacent to the track such that a rider may experience different thrill levels depending on the position of the car in relation to the track. The car may have a swiveling arm to position the car above, lateral to, or below the track. Alternatively, ride may have multiple cars arranged above, lateral to, or below the track for the rider to choose which position to ride in. In lieu of or in addition to the car seating options, the may have adjustable shoulder restraints that allow the rider to use the shoulder restraints or not. The shoulder restraints may be flexible or rigid, but rotatable from an upright configuration to a sideways configuration.

19 Claims, 9 Drawing Sheets (56) References Cited

U.S. PATENT DOCUMENTS

| | | | |
|---|---|---|---|
| 2012/0149480 A1* | 6/2012 | Crawford | A63G 31/16 472/130 |
| 2014/0158014 A1 | 6/2014 | Pumpelly | |
| 2015/0133227 A1 | 5/2015 | Reed | |

* cited by examiner

AMUSEMENT PARK RIDE WITH ADJUSTABLE THRILL LEVELS

CROSS-REFERENCE TO RELATED APPLICATIONS

This patent application is a continuation-in-part application of U.S. patent application Ser. No. 14/925,085, filed Oct. 28, 2015, entitled "Amusement Park Ride with Adjustable Thrill Level," which application is incorporated in its entirety here by this reference.

TECHNICAL FIELD

This invention relates to an amusement park ride, and more particularly to a roller coaster with adjustable car seating and adjustable body restraints, such that a rider may experience different thrill levels.

BACKGROUND

There are many different amusement park rides, accommodating different thrill levels for the hundreds of millions of people visiting amusement parks each year. On most amusement park thrill rides such as roller coasters, cars are either equipped with lap restraints or over-the-shoulder restraints. This current situation limits the variability of ride experiences and sometimes fails to please all riders. Some park guests dislike lap restraints on certain attractions because they do not feel sufficiently secure; other riders complain that over-the-shoulder restraints diminish the thrill of openness and mobility on amusement park attractions. As a result, there seems to be a need for a greater breadth of options for amusement park guests in order to attract and satisfy more riders, on rides that do not necessarily require one specific type of restraint.

Similarly, most rides are limited in terms of where the rider is in relation to the track of the ride. The same track may provide completely different experiences if the rider is on top of the track, on the side of the track, or below the track. As a result, there seems to be a need for an amusement park ride that offers at least these three options, such that it attracts riders that seek to experience the different thrill levels associated with the position of the rider in relation to the track.

For the foregoing reasons, there is a need for an amusement park ride that offers adjustable thrill levels through various permutations of changing the position of the car seat and/or changing the combination of body restraints for the rider in some rides.

SUMMARY

The present invention is directed to an amusement park ride that provides different thrill levels depending on the position of the car in relation to the track and/or a car having an adjustable restraint system that can be locked in at least two different positions. The amusement park ride comprises a track, a car that is operatively attached to the track, a pair of shoulder restraints that may assume either an upright position or a side position, a lap restraint operatively attached to the pair of shoulder restraints. In some embodiments, in lieu of or in addition to the adjustable shoulder restraints, the ride may have a swiveling arm that moves the car to different positions in relation to the track.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The present invention is configured to give the rider more control in how much thrill he or she experiences during a ride. Factors that can affect the thrill level of a ride include, the speed of the car, the pathway of the ride, the direction of travel, the abruptness of movement, the extent of the restraint system, seat location, and the like. For typical rides, these factors are generally fixed. Therefore, one ride can only offer one thrill level, unless a different seat location is chosen.

Figure 1:
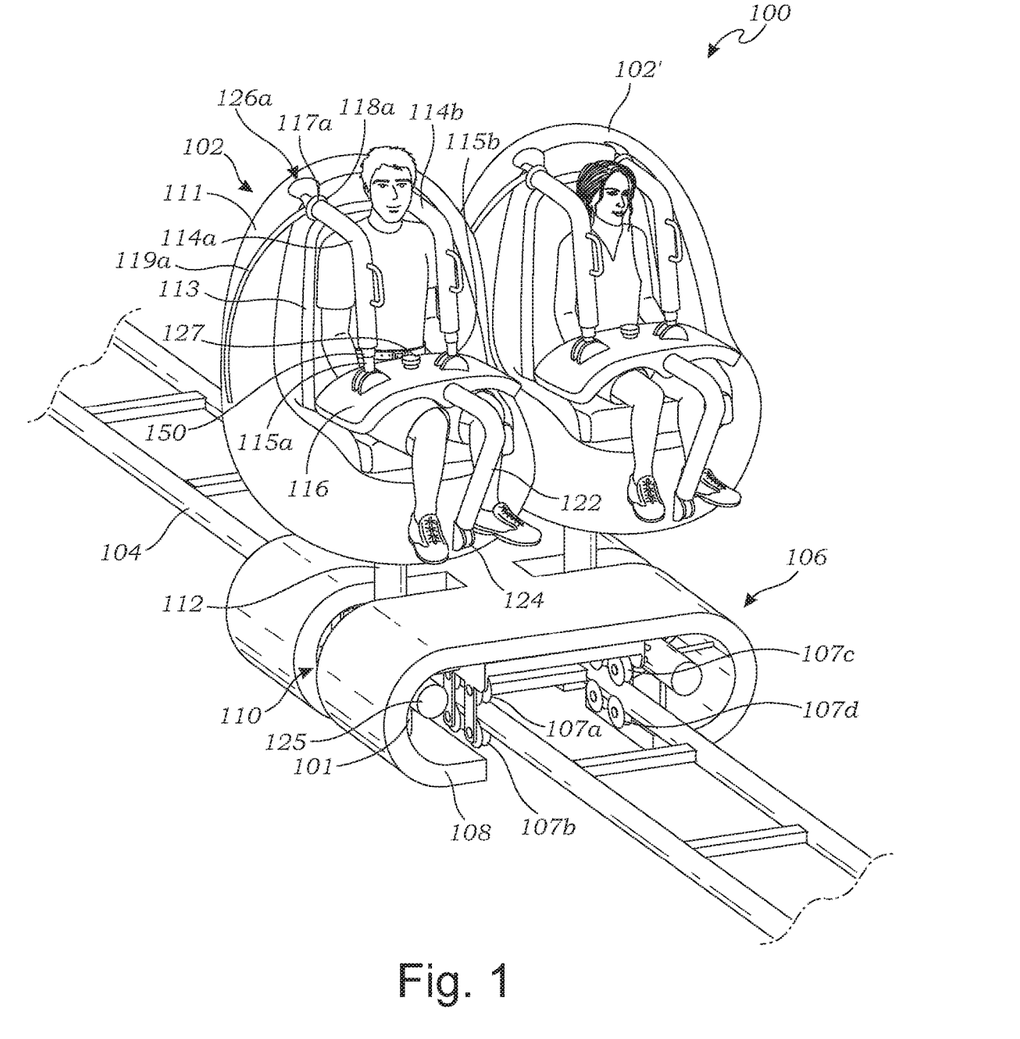
FIG. 1 shows a perspective view of the amusement park ride of the present invention with cars positioned above a track.
Figure 3:
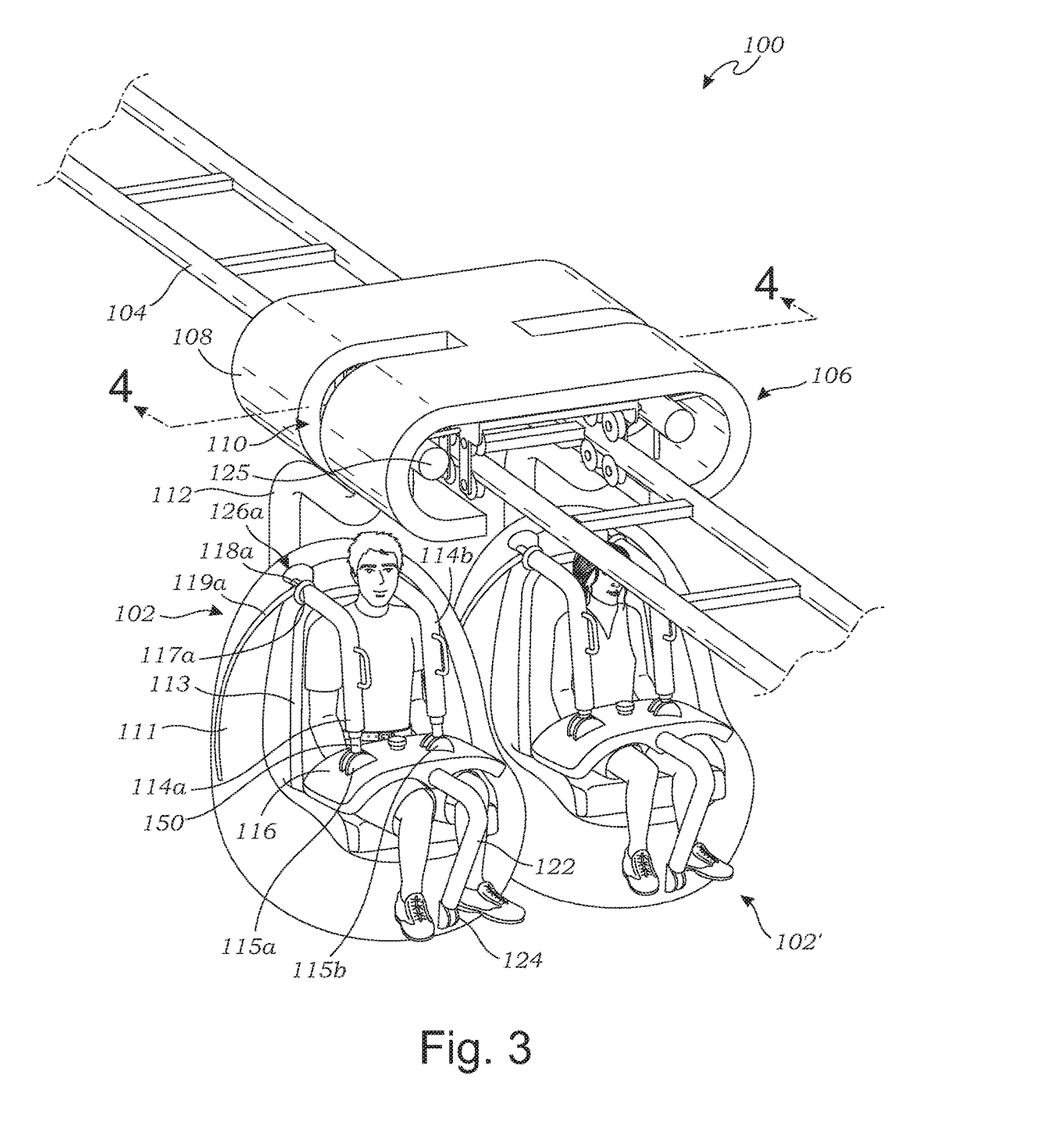
FIG. 3 shows a perspective view of the amusement park ride with the cars positioned below the track.
Figure 4:
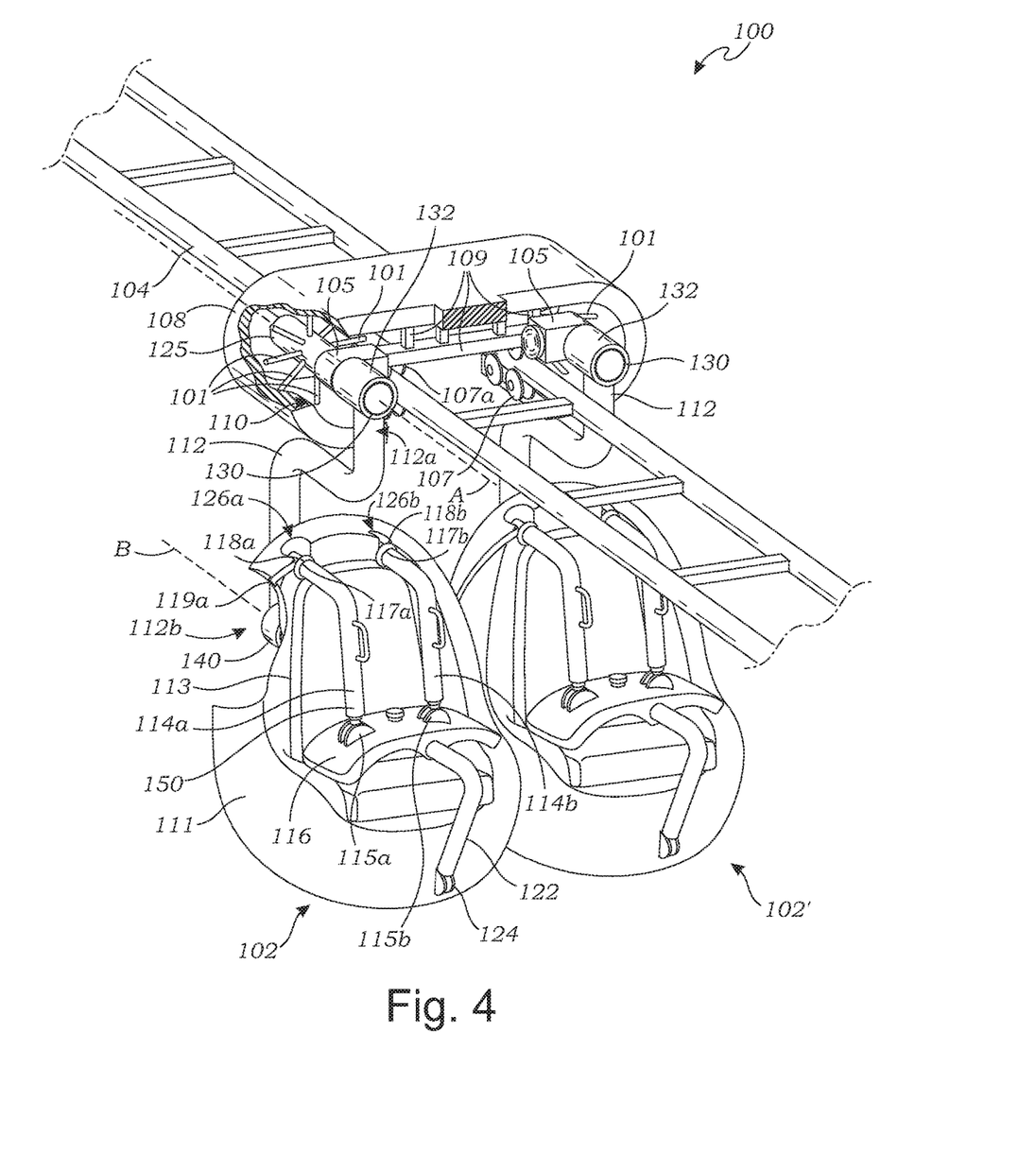
FIG. 4 shows a cross sectional view of the shroud taken at line 4-4 of FIG. 3 with portions of a shroud and car removed for clarity.
Figure 5A:
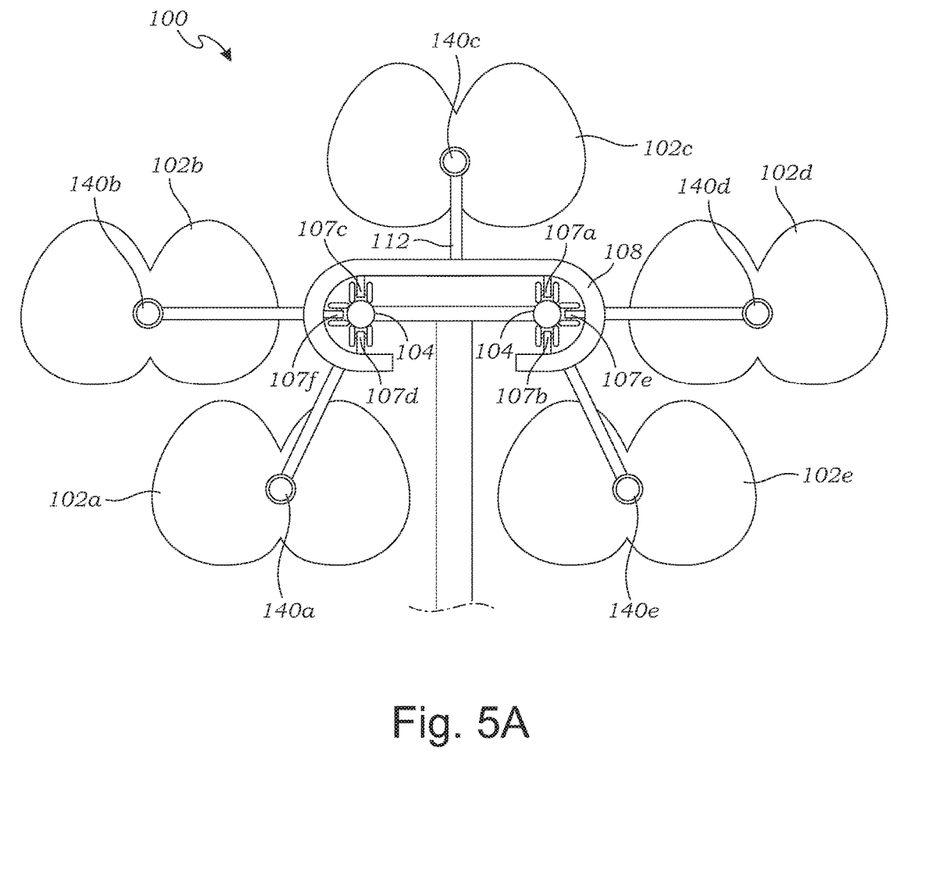
FIG. 5A shows a rear view of an amusement park ride with a plurality of egg-shaped cars on a two-rail track. The cars are not drawn to scale.
Figure 5B:
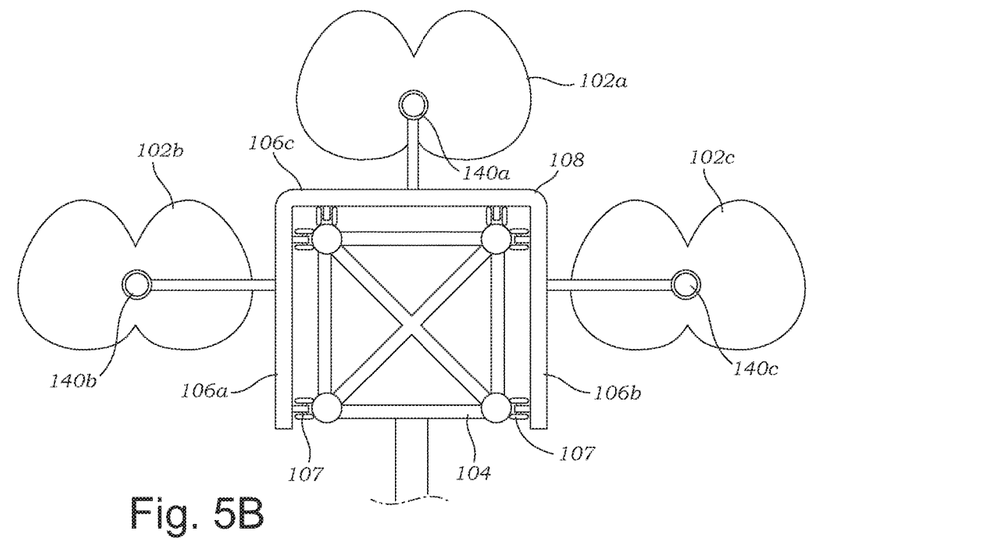
FIG. 5B shows a rear view of an amusement park ride with a plurality of egg-shaped cars on a four-rail track. The cars are not drawn to scale.
Figure 5C:
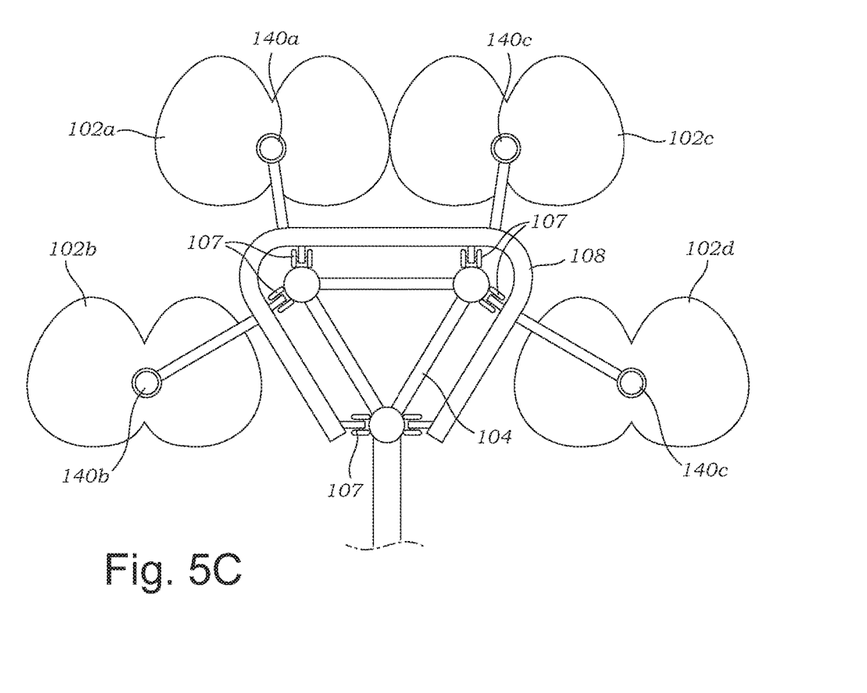
FIG. 5C shows a rear view of an amusement park ride with a plurality of egg-shaped cars on a three-rail track. The cars are not drawn to scale.
Figure 6:
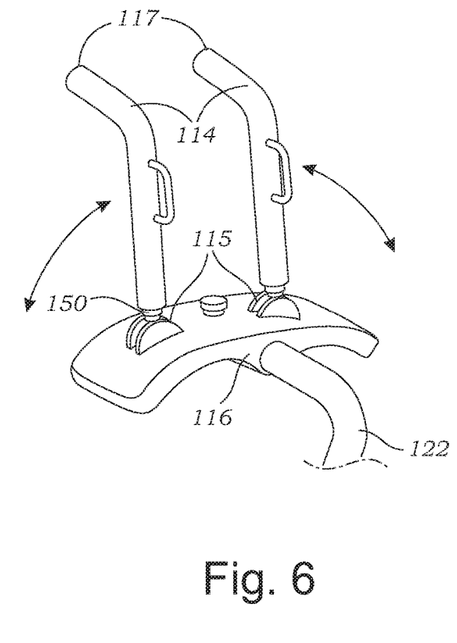
FIG. 6 shows the direction a pair of shoulder restraints of the amusement park ride of the present invention may move from its upright position when operatively attached to a lap restraint.
Figure 7:
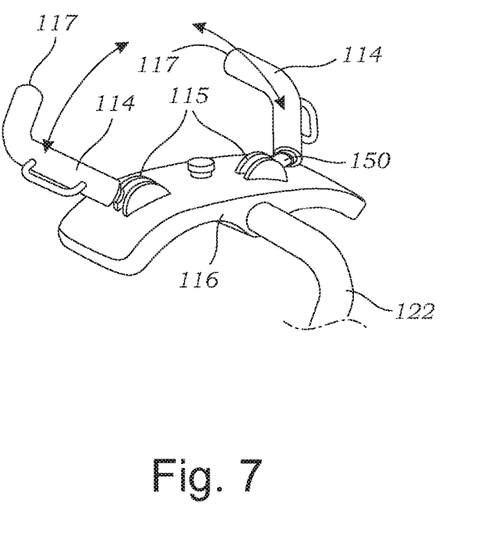
FIG. 7 shows the direction the pair of shoulder restraints of the amusement park ride of the present invention may move from its lateral position when operatively attached to the lap restraint.
Figures 8, 9:
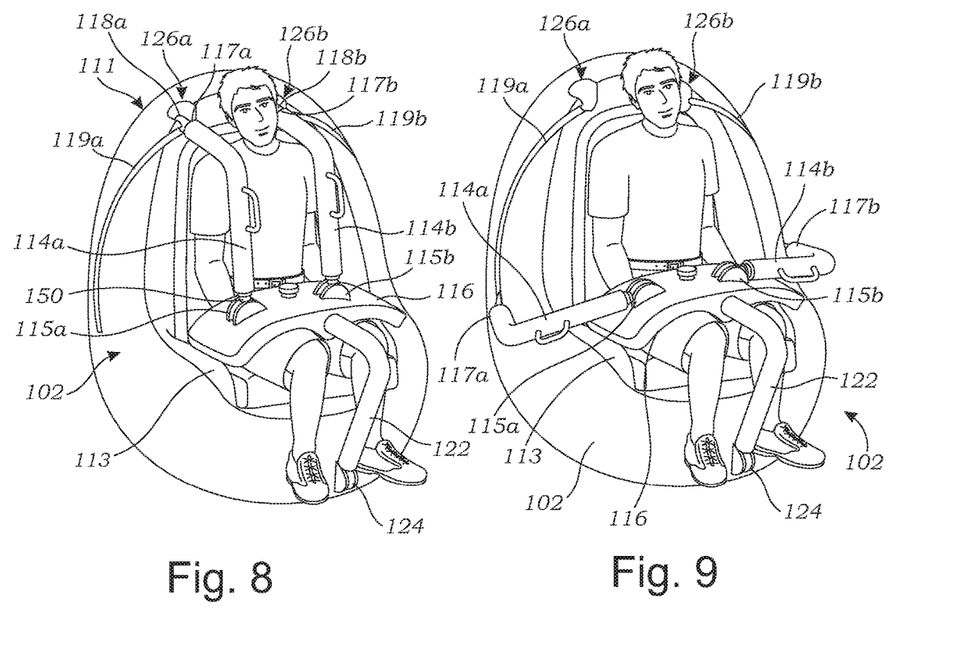
FIG. 8 shows a perspective view of another embodiment of the car of the amusement park ride, with the shoulder restraints in a first configuration.
FIG. 9 shows a perspective view of the car in FIG. 8 with the shoulder restraints in a second configuration.
Figures 10, 11:
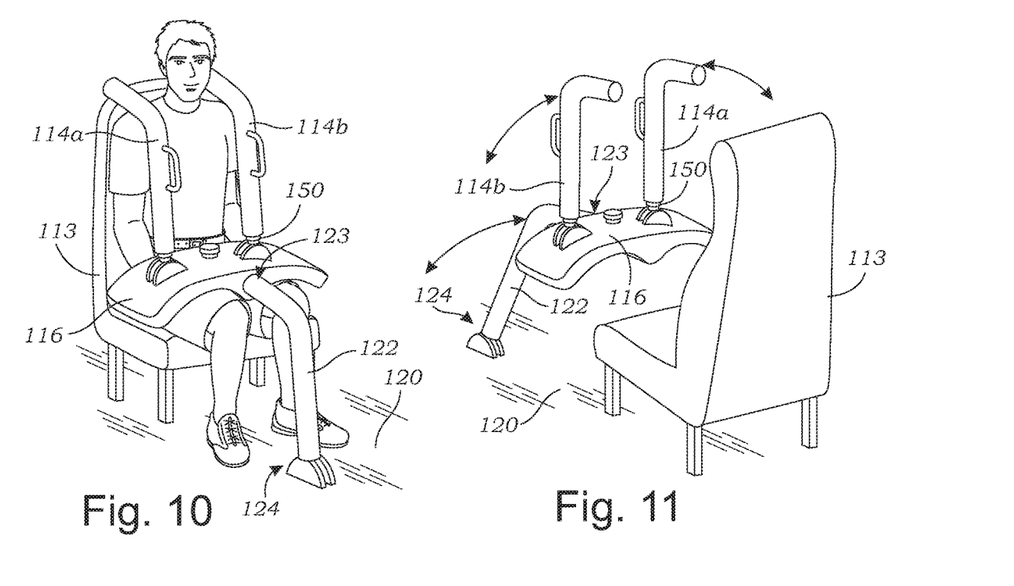
FIG. 10 shows a pair of shoulder restraints, a lap restraint, and a seat of another embodiment of the amusement park ride of the present invention.
FIG. 11 shows a perspective view of another embodiment of the amusement park ride, illustrating the direction the pair of shoulder restraints and the lap restraint may move from their respective upright positions.

The invention of the present application changes this monotony by either allowing the cars to have different positions relative to the track, by adjusting the restraint system, or both. As shown in FIG. 1, an amusement park ride 100 of the present invention comprises a car 102 that is operatively attached to a track 104. The car 102 has an exterior shell 111 and an open seating compartment 113. In the preferred embodiment, the exterior shell 111 may have an egg-shaped design as shown in FIGS. 1-4 and 8-9 or a conjoined egg-shaped design as shown in FIGS. 5A-5C. The exterior can take on other shapes as well and is not limited to an egg shape.

The car 102 may be operatively attached to a track 104 by being mounted to a bogie 106 that moves along the track 104. The bogie 106 moves along the track on a set of wheels 107a-d. The set of wheels 107a-d may comprise a set of upper wheels 107a, 107c that roll on top of the track 104, and a set of lower wheels 107b, 107d that roll beneath the track 104. In some embodiments, a set of side wheels 107f, 107g that roll along the side of the track 104 may also be used as shown in FIG. 5A.

Figure 2:
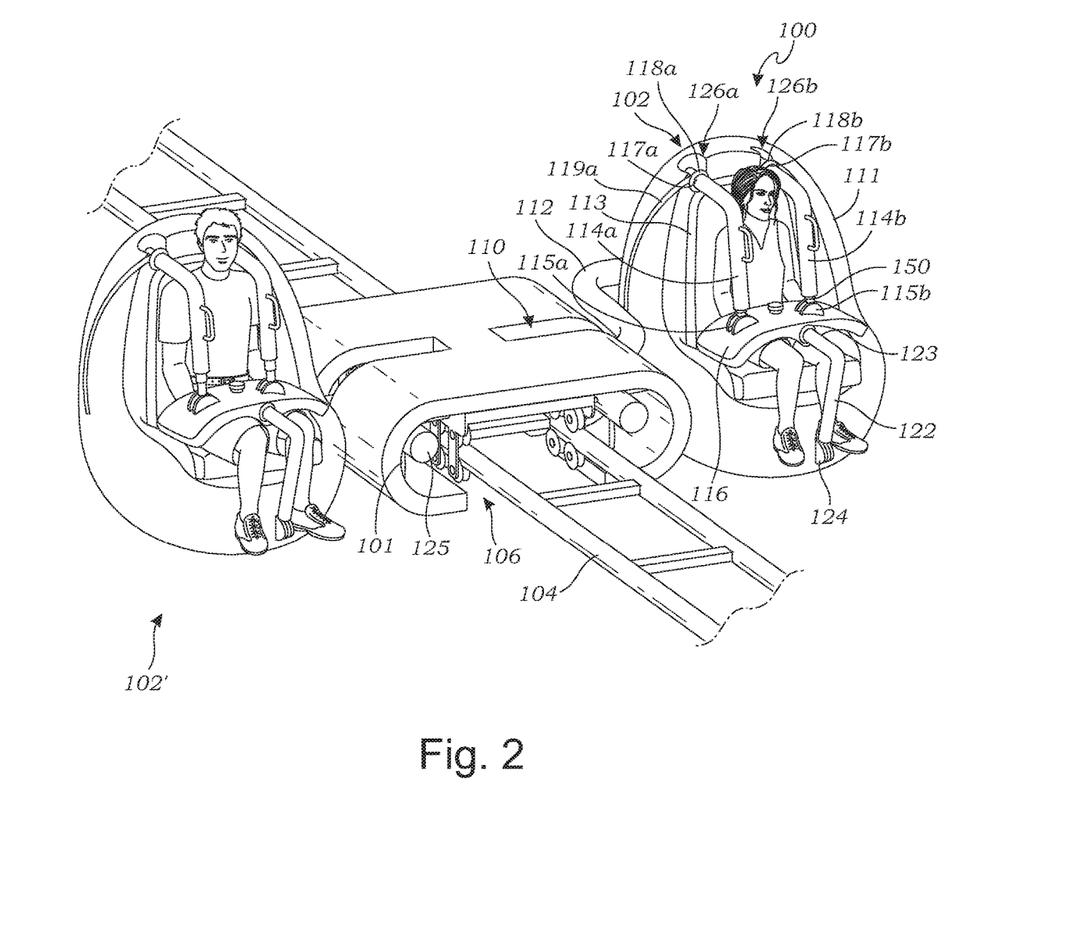
FIG. 2 shows a perspective view of the amusement park ride with the cars positioned laterally adjacent to the track.

The bogie 106 may be attached to the car 102 in a manner that allows the car 102 to move to different positions relative to the track 104. For example, as shown in FIG. 1, in a first position, the car 102 may be positioned above the track 104. At the rider's options, the car 102 may be moved into a second position laterally adjacent to the track 104 as shown in FIG. 2. At the rider's option, the car 102 may be positioned below the track 104 as shown in FIG. 3. In some embodiments, the car 102 may be placed in many other positions in between the first position and the third position.

To permit the car to accommodate multiple positions, the car 102 may be attached to the bogie 106 by a swiveling arm 112. Referring to FIG. 4, the swiveling arm 112 may comprise a first end 112a operatively connected to the bogie 106 at a first attachment point to allow the arm to rotate about a first end axis A that is generally parallel to the track 104, and a second end 112b, opposite the first end 112a, rotatably mounted to the car 102 at a second attachment point to allow the car 102 to rotate about a second end axis B generally parallel to the track 104.

The second end 112b may be attached to the exterior shell 111 of the car 102 on the back side of the car 102 opposite the seating compartment 113. The attachment of the second end 112b to the car 102 may be a freewheeling attachment (for example, with the use of bearings, hinges, joints, and the like) in which the car is free to rotate in a clockwise or counterclockwise manner (when viewing the car 102 from the front or the back side) about the second end axis B. The freewheeling action can add to the level of thrill because of the feeling of instability as the car may rock laterally at various turns in the ride. At the same time, the freewheeling attachment can offer a level of stability because the car 102 may try to maintain the same orientation. For example, the portion of the car 102 below the freewheeling attachment may be heavier than the portion of the car 102 above the freewheeling attachment. Such an uneven weight distribution forces the car 102 to maintain an upright orientation, such that the top side of the car 102 (the portion adjacent to the rider's head) remains above the bottom side of the car 102 (the portion adjacent to the rider's feet). Therefore, whether the swiveling arm 112 positions the car 102 above, lateral to, or below the track 104, the car will automatically remain in the upright orientation due to gravity. In such an embodiment, the swiveling arm 112 is configured to provide sufficient clearance from the other structures of the ride so as not to hit other structures during any rotational movement. Of course, in some rides, the gravitational force can be overridden by centrifugal forces.

In some embodiments, the attachment of the second end 112b to the swiveling arm 112 may be a controlled attachment in which gears, for example, are used to control the rotation of the car 102 about the second end axis B. The gears may be locked so that when the swivel arm 112 rotates about the first end axis A, the car 102 remains fixed relative to the swivel arm 112 and, therefore, is oriented differently relative to the track 104.

The connection of the swivel arm 112 to the bogie 106 may also be a controlled connection. Gears may be used to facilitate rotation of the swivel arm 112. For example, the bogie 106 may comprise a stationary bar 125 that is parallel to the track 104. The stationary bar 125 may have a rotating component 130, such as a gear. The rotating component 130 may be operatively connected to a motor 105 to cause the rotating component 130 to rotate. The first end 112a of the swiveling arm 112 may comprise a hub 132 that can be mounted on the rotating component 130. The inner surface of the hub 132 may be toothed so that rotation of the rotating component 130 causes rotation of the hub 132, which in turn allows the swiveling arm 112 to rotate at least 180 degrees from vertically upward to vertically downward and vice versa.

The bogie 106 may further comprise a shroud 108 to cover the stationary bar 125, motor 105, and the wheels 107. In some embodiments, the shroud 108 may comprise a cutout 110. The cutout 110 allows the swiveling arm 112 to extend past the shroud and rotate within the cutout 110, without touching the shroud 108. Braces 101, 109 may be used to connect the stationary bar 125 and the shroud 108 to each other and provide structural support. In some embodiments, the swiveling arm 112 may extend perpendicularly from the stationary bar 125. In the preferred embodiment, the swiveling arm 112 extends out of the cutout 110 in line with the approximate center of the car 102, then bends backwards towards the backside of the car and operatively attaches to the exterior shell 111 at the back.

The car 102 may change its position in relation to the track 104 via the swiveling arm 112 to multiple positions, such as a first position above the track 104 (see FIG. 1), a second position lateral to the track 104 (see FIG. 2), a third position below the track 104 (see FIG. 3), and any position therebetween. Once the car 102 is placed at a desired position, the car 102 may remain in that position during the ride, or the car 102 can be adjusted to a new position during the ride. Adjustment of the car 102 to different positions may be caused by natural forces, such as centrifugal force or gravitational force caused by the movement of the car 102 along the track 104. If natural forces are allowed to cause movement of the cars 102, then additional precautionary measures may be implemented to prevent the cars 102 from crashing into each other. For example, stops (such as physical barriers, magnetic forces, electronic sensors, and the like) may be put in place to prevent cars from approaching too close to each other, or cushions may be used to absorb and minimize the force of any impact.

In some embodiments, adjustment of the car 102 to different positions may be caused by the user or the operator by controlling the motor 105. An operator of the amusement park ride 100 or a rider may move the car 102 before or during a ride via an actuator 127, such as a button or a lever that may be located on the car 102, such as on the lap restraint 116 as shown in FIG. 1, or at the loading station.

In some embodiments as shown in FIGS. 1 through 4, the amusement park ride 100 may comprise at least two cars 102, 102' that are operatively attached to the track 104, such that the cars 102, 102' are mounted to the bogie 106. The cars 102, 102' may change their respective positions to a position lateral to the track 104 by moving away from each other and projecting laterally away from opposite sides of the track, and may change their respective positions to above or below the track 104 by moving toward one another.

In some embodiments, as shown in FIG. 5A, the amusement park ride 100 may also comprise multiple cars 102*a-e* with multiple seats 113 in each of the multiple cars 102*a-e*. In addition, instead of having the swiveling arm 112 rotating to provide the various positions in relation to the track 104, the swiveling arms 112 may be stationary and securely attached to the shroud 108. Consequently, there may be cars 102 present in three (3) general positions: the first position above the track 104 (car 102*c*), the second position laterally adjacent to the track 104 (cars 102*b*, 102*d*), and the third position below the track 104 (cars 102*a*, 102*e*), creating more seating options. Alternatively, there may be only cars present in one or two of the three general positions and/or in other various positions relative to the track, such as to the side and above the track 104 or to the side and below the track 104, or any combination of positions.

The position of the cars 102 may also be dictated by the type of track 104 used. Some tracks may be a multi-rail track having two rails, three rails, four rails, or even more rails. The number of rails may influence the configuration of the shroud 108. This, in turn, may dictate the position of the cars 102. For example, FIG. 5B shows a four rail track in a rectangular configuration. The shroud 108 may be U-shaped or box-shaped having a first section 106*a* on one side of the track 104, a second section 106*b* on the opposite side of the track, and a third section 106*c* on top of the track and connecting the first section 106*a* with the second section 106*b*. Due to the U-shaped configuration, the shroud 108 can cover a substantial portion of the track 104. The cars 102*a-c* can be attached to the first section 106*a*, second section 106*b*, and/or the third section 106*c*. These attachments 140*a-c* may be fixed attachments or movable attachments.

Similarly, as shown in FIG. 5C, the shroud 108 may conform to a three rail track 104. Since the three rail track 104 has a triangular configuration in cross-section, the shroud 108 will similarly have a triangular configuration in cross-section. Thus the first section 106*a* and the second section 106*b* may taper towards each other moving away from the third section 106*c*. In either case, wheels 107 operatively connect the shroud 108 to the track 104 to allow the cars 102 to ride along the track 104. Given the configuration of the shroud 108, the cars can be positioned in various arrangements including, but not limited to, the arrangements shown in FIGS. 5A-5C.

Aside from the movement of the car 102 relative to the shroud 108, the thrill level of a ride can be altered by the restraint system that secures the rider in the car 102. FIGS. 6-14 will be referred to in describing the restraint system; however, the restrain system can be applied to any embodiment described herein as demonstrated by FIGS. 1-4. When riding the amusement park ride 100, the rider may choose to utilize a combination of shoulder restraints 114 and a lap restraint 116 if he or she desires less of a thrill, or only utilize the lap restraint 116 if he or she desires more of a thrill. Therefore, the shoulder restraints 114 may be adjustable from an upright or restrained position (FIG. 6), which restrains the rider at the shoulders to limit or restrict movement of the upper body, thereby providing less of a thrill, to a sideways or freed position (FIG. 7), which unrestrains or frees the rider's shoulders and allows the upper body to move more liberally, thereby providing more of a thrill. The shoulder restraints 114 may be rigid bars or flexible straps.

For example, with reference to FIGS. 1-4 and 6-13, the car 102 may comprise a pair of shoulder restraints 114*a*, 114*b*, each shoulder restraint 114*a*, 114*b* comprising a first end 115*a*, 115*b* and a second end 117*a*, 117*b*. In some embodiments, the first end 115*a*, 115*b* may be a free end. In some embodiments, the first end 115*a*, 115*b* may be connected to a portion of the car 102, for example, the external shell 111, the seat 113, the floor 120 of the car, and the like. In some embodiments, the car 102 may comprise a lap restraint 116, and the first ends 115*a*, 115*b* of the shoulder restraints 114*a*, 114*b* may be attached to the lap restraint 116. If the first ends 115*a*, 115*b* are connected to a portion of the car 102, such as the external shell 111, the seat 113, or the lap restraint 116, the connection will be a rotatable connection, such as with a swivel, articulating joint, a hinge, and the like. The rotatable connection at the first ends 115*a*, 115*b* allows the second ends 117*a*, 117*b* to move from an upright configuration, in which the shoulder restraints are generally parallel to the torso of the rider, to a sideways configuration, in which the shoulder restraints are generally perpendicular to the torso of the rider or generally project laterally away from the rider. In some embodiments, the first ends 115*a*, 115*b* may utilize telescoping arms 150 to allow the shoulder restraints 114*a*, 114*b* to be adjustable to accommodate riders of different sizes or to accommodate the transition of the shoulder restraints from the upright configuration to the sideways configuration.

The second ends 117*a*, 117*b* of the shoulder restraints 114*a*, 114*b* may be connected to the external shell 111 in a manner that allows the second ends 117*a*, 117*b* to move from an upright configuration to a sideways configuration. For example, the connection of the second ends 117*a*, 117*b* to the external shell 111 may be detachable connections 118*a*, 118*b* located along the top side of the external shell 111. The detachable connections 118*a*, 118*b* may be an electromagnet, a hook, a latch mechanism, and the like, or any combination thereof. The detachable connections 118*a*, 118*b* allows the second ends 117*a*, 117*b* to be securely fastened to the external shell 111 or some other portion of the car 102 to secure the rider inside the car 102 by securing the shoulders of the rider. When the second ends 117*a*, 117*b* are detached from the external shell 111 or some other portion of the car 102, the second ends 117*a*, 117*b* are free to move. The second end 117 can be re-attached to the external shell 111 or some other portion of the car 102 that allows the shoulder restraint 114 to be sideways or even downward.

In some embodiments, the external shell 111 may comprise channels 119*a*, 119*b* through which the second ends 117*a*, 117*b* can slide. Once the second ends 117*a*, 117*b* are detached, the second ends 117*a*, 117*b* can slide along their respective channels 119*a*, 119*b* to a second configuration in which the second ends 117*a*, 117*b* are located near or below the center point of the car 102. This substantially moves the shoulder restraints 114*a*, 114*b* away from the rider to give the rider a less secure feeling, thereby increasing the thrill level. The second ends 117*a*, 117*b* can then be locked in this configuration, again with the use of electromagnets, hooks, latch systems, and the like, or any combination thereof.

Therefore, in use, the shoulder restraints 114a, 114b may be placed in an upright position and the second ends 117a, 117b may be attached onto the corresponding detachable connection 118a, 118b that may be located inside corresponding cutouts 126a, 126b on the car 102. When attached in the preferred embodiment, the second ends 117a, 117b and the corresponding detachable connections 118a, 118b form lockable hinge assemblies that allow the shoulder restraints 114a, 114b to rotate at the detachable connection 118a, 118b. The direction of rotation allows the first ends 115a, 115b of the shoulder restraint 114a, 114b to move upwardly and away from the seat 113 to provide sufficient clearance for the rider to enter the car 102.

Once the rider is properly situated in the car 102 the shoulder restraints 114a, 114b can be lowered onto the shoulders of the rider. If the rider chooses to enhance the thrill experienced of the ride, the second ends 117a, 117b of the shoulder restraints 114a, 114b can be released and moved laterally sideways, preferably along their respective channels 119a, 119b, and locked into place in a second configuration in which the shoulder restraints 114a, 114b no longer restrain the shoulders of the rider.

In some embodiments, the shoulder restraints 114a, 114b may be attached to a lap restraint 116. The lap restraint 116 may be attached to another portion of the car 102, such as the external shell 111 at the front side, or a floor 120 of the car 102, by a lap restraint support arm 122 having a first end 123 and a second end 124. The lap restraint support arm 122 may be operatively attached to the lap restraint 116 at the first end 123, and operatively attached to external shell 111, the seat 113, the floor 120, or some other convenient location of the car 102 at the second end 124. The second end 124 may be a hinge, joint, swivel, or any other type of articulation point that allows the lap restraint support arm 122 to move towards or away from the rider.

Figure 12:
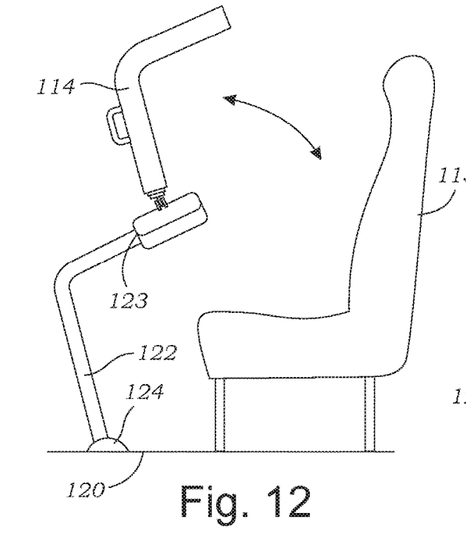
FIG. 12 shows a side view of another embodiment of the amusement park ride, illustrating the direction the lap restraint may move from its upright position.
Figure 13:
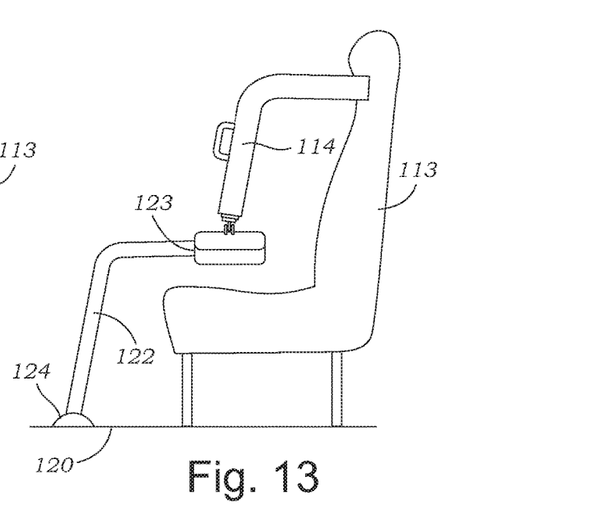
FIG. 13 shows a side view of another embodiment of the amusement park ride, illustrating the pair of shoulder restraints in upright position and the lap restraint in its down position.

Therefore, when the rider wishes to leave the seat 113, the second ends 117a, 117b of the shoulder restraints 114a, 114b may be released from the detachable connections 118a, 118b, and the lap restraint support arm 122 may be moved away from the seat 113 as shown in FIG. 12. This action moves the lap restraint 116 and the shoulder restraints 114a, 114b away from the rider. The rider can then exit the car 102. When the rider enters the car, the lap restraint support arm 122 may be moved towards the seat 113 so that the lap restraint 116 is above the lap of the rider and the shoulder restraints 114a, 114b block the shoulders of the rider as shown in FIG. 13. The second ends 117a, 117b of the shoulder restraints 114a, 114b can be locked to the detachable connection 118a, 118b in the upright configuration. If the rider chooses to increase the thrill level, the rider can have the second ends 117a, 117b of the shoulder restraints 114a, 114b released so that the second ends 117a, 117b of the shoulder restraints can be moved sideways so as not to block the shoulders of the rider. In some embodiments, the second ends 117a, 117b may ride along the channels 119a, 119b. The second ends 117a, 117b can be locked in this second configuration.

In some embodiments, the channels 119a, 119b may follow an arcuate path that may be equidistant from their respective first ends 115 of the shoulder restraints 114. Preferably, the channels 119a, 119b are created in the external shell 111. In embodiments utilizing telescoping arms 150, the channels 119a, 119b may be linear or have other shapes because the telescoping arms 150 can adjust to keep the shoulder restraints 114a, 114b within their respective channels 119a, 119b.

Figure 14:
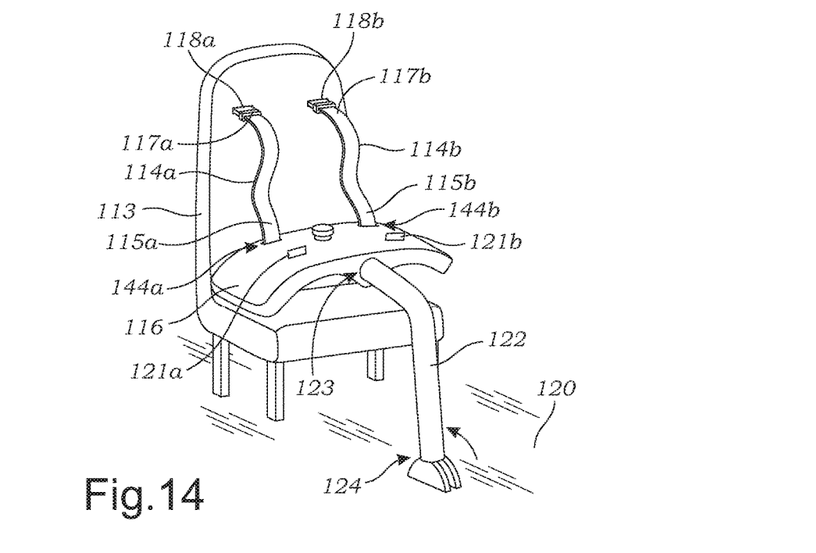
FIG. 14 shows a flexible pair of shoulder restraints, a lap restraint, and a seat of another embodiment of the amusement park ride of the present invention.

In some embodiments, as shown in FIGS. 1-4 and 6-13, the shoulder restraints 114a, 114b may be rigid bars with padding. However, in some embodiments, as shown in FIG. 14, the shoulder restraints 114a, 114b may be flexible straps, each shoulder restraint 114a, 114b attachable to separate detachable connections 118a, 118b, such as hooks, magnets, latches, buckles, etc. above the rider's shoulders to function as over-the-shoulder restraints. Flexible shoulder restraints 114a, 114b function like seatbelt-type restraint and may be more comfortable than rigid shoulder restraints. To increase the thrill level, the shoulder restraints can be released from the car at the second ends 117a, 117b. The second ends 117a, 117b can then be reattached at some other attachment point 121a, 121b on the car 102 to prevent the shoulder restraints 114a, 114b from flailing about. For example, the attachment points 121a, 121b may be located on the lap restraint 116, the seat 113, the external shell 111, and the like. In such an embodiment, the shoulder restraints 114a, 114b can function as handles for the rider to grip with his or her hands. In some embodiments, there may be multiple attachment points 121a, 121b so the rider can choose where to secure the shoulder restraints 114a, 114b when not desired for use.

In some embodiments, the first ends 115a, 115b of the shoulder restraints 114a, 114b may be operatively connected to a retractor mechanism housed inside the lap restraint 116. The shoulder restraints 114a, 114b may extend out from slits 144a, 144b created in the lap restraint 114. To disable the shoulder restraints 114a, 114b from use, the user can simply detach the second ends 117a, 117b of the shoulder restraints 114a, 114b and allow the shoulder restraints 114a, 114b to retract through the slits 144a, 144b into the lap restraint 116 like a traditional seatbelt in an automobile.

Although the thrill level adjustment is described as it pertains to roller coaster rides, these concepts and ideas can be applied to any amusement park ride. However, precautions must be taken by every amusement park to ensure the actual safety of the riders by incorporating proper safety mechanisms. The ride of the present invention is intended to give the illusion or perception of increased danger, and therefore, higher level of thrill, but each ride should be designed and tested to assure that riders cannot actually fall out of the ride regardless of the position of the shoulder restraints 114a, 114b.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. An amusement park ride, comprising:
   a. a bogie that moves along a track, the bogie comprising a set of wheels to ride along the track, wherein the set of wheels comprises a set of upper wheels for traveling on top of the track and a set of lower wheels for traveling below the track, the bogie comprising a stationary bar that is parallel to the track, a motor adjacent to the stationary bar, a shroud covering the motor, the shroud comprising a cutout, and a plurality of braces that support and connect the shroud and stationary bar;

b. a swiveling arm rotatably attached to the stationary bar at a hinge assembly and controlled by the motor to allow the swiveling arm to rotate from a vertically upward position to a vertically downward position, the swiveling arm protruding through the cutout of the shroud; and
c. a car, comprising:
  i. an exterior shell;
  ii. an interior that forms a seat opposite a back side of the exterior shell;
  iii. shoulder restraints, each shoulder restraint comprising a first end and a second end;
  iv. a pair of detachable connections configured to attach to the respective second end of the respective shoulder restraint; and
  v. a lap restraint operatively connected to the shoulder restraints at the first ends of the shoulder restraints, wherein the shoulder restraints can change between a restrained position to restrain shoulders of a rider, thereby providing less of a thrill, and an unrestrained position, which provides more of a thrill, and wherein the swiveling arm is rotatably connected to the exterior shell, such that the swiveling arm is configured to rotate the car in relation to the track, while maintaining the car in an upright position.

2. The amusement park ride of claim 1, wherein in the restrained position, the shoulder restraints are in an upright position, and wherein in the unrestrained position the shoulder restraints are in a sideways position.

3. The amusement park ride of claim 2, wherein each second end is disposed within a separate channel, such that the shoulder restraints may operably slide through their respective channel allowing the shoulder restraints to slide to the unrestrained position.

4. The amusement park ride of claim 3, wherein the lap restraint is operatively connected to the car.

5. An amusement park ride, comprising: a car, the car comprising:
a. an exterior shell;
b. an interior that forms a seat opposite a back side of the exterior shell;
c. shoulder restraints, each shoulder restraint comprising a first end and a second end; and
d. a pair of corresponding detachable connections on the car, each detachable connection configured to be attachable to one of the second ends of the shoulder restraints, wherein the shoulder restraints are rigid and configured to change between an upright position in which the shoulders of a rider are restrained, and a sideways position in which the shoulders of the rider are freed, wherein each second end of the shoulder restraints is disposed within a channel, such that the shoulder restraints may operably slide through their respective channel allowing the pair of shoulder restraints to slide from the upright position to the sideways position, and vice versa.

6. An amusement park ride, comprising: a car, the car comprising:
a. an exterior shell;
b. an interior that forms a seat opposite a back side of the exterior shell;
c. shoulder restraints, each shoulder restraint comprising a first end and a second end;
d. a pair of corresponding detachable connections on the car, each detachable connection configured to be attachable to one of the second ends of the shoulder restraints, wherein the shoulder restraints are rigid and configured to change between an upright position in which the shoulders of a rider are restrained, and a sideways position in which the shoulders of the rider are freed, wherein each second end of the shoulder restraints is disposed within a channel, such that the shoulder restraints may operably slide through their respective channel allowing the pair of shoulder restraints to slide from the upright position to the sideways position, and vice versa; and
e. a lap restraint, wherein the first ends of the shoulder restraints are rotatably connected to the lap restraint to allow the shoulder restraints to move from the upright position to the sideways position, and vice versa.

7. The amusement park of claim 6, wherein the lap restraint is operatively connected to the car.

8. The amusement park ride of claim 6, comprising a plurality of cars mounted on a bogie, wherein the cars are located at positions selected from the group consisting of above a track, below the track, and lateral to the track.

9. The amusement park ride of claim 6, wherein the car is configured to rotate about a track, upon which the car is mounted, to positions above the track, below the track, and laterally adjacent to the track.

10. The amusement park ride of claim 9, further comprising:
a. a bogie operatively connecting the car to the track;
b. a swiveling arm having a first end and a second end, the first end operatively connected to the bogie via a rotating component, and the second end operatively connected to the car; and
c. a motor operatively connected to the rotating component to control the rotating component to rotate the swiveling arm.

11. The amusement ride of claim 10, wherein the second end of the swiveling arm is rotatably connected to the car to allow the car to maintain an upright orientation.

12. The amusement park ride of claim 10, further comprising an actuator that operatively communicates with the swiveling arm to change the position of the swiveling arm.

13. The amusement park ride of claim 6, wherein each shoulder restraint comprises a telescoping arm.

14. The amusement park ride of claim 5, comprising a plurality of cars mounted on a bogie, wherein the cars are located at positions selected from the group consisting of above a track, below the track, and lateral to the track.

15. The amusement park ride of claim 5, wherein the car is configured to rotate about a track, upon which the car is mounted, to positions above the track, below the track, and laterally adjacent to the track.

16. The amusement park ride of claim 15, further comprising:
a. a bogie operatively connecting the car to the track;
b. a swiveling arm having a first end and a second end, the first end operatively connected to the bogie via a rotating component, and the second end operatively connected to the car; and
c. a motor operatively connected to the rotating component to control the rotating component to rotate the swiveling arm.

17. The amusement ride of claim 16, wherein the second end of the swiveling arm is rotatably connected to the car to allow the car to maintain an upright orientation.

18. The amusement park ride of claim 16, further comprising an actuator that operatively communicates with the swiveling arm to change the position of the swiveling arm.

19. The amusement park ride of claim 5, wherein each shoulder restraint comprises a telescoping arm.

* * * * *